United States Patent
Srinivasan et al.

(10) Patent No.: US 9,600,315 B2
(45) Date of Patent: Mar. 21, 2017

(54) SEAMLESS TAKEOVER OF A STATEFUL PROTOCOL SESSION IN A VIRTUAL MACHINE ENVIRONMENT

(75) Inventors: Kiran Srinivasan, Sunnyvale, CA (US); Timothy C. Bisson, Fremont, CA (US)

(73) Assignee: NETAPP, INC., Sunnyvale, CA (US)

(*) Notice: Subject to any disclaimer, the term of this patent is extended or adjusted under 35 U.S.C. 154(b) by 1539 days.

(21) Appl. No.: 12/910,535

(22) Filed: Oct. 22, 2010

(65) Prior Publication Data

US 2012/0102135 A1  Apr. 26, 2012

(51) Int. Cl.
| | | |
|---|---|---|
| G06F 11/00 | (2006.01) | |
| G06F 15/16 | (2006.01) | |
| G06F 15/167 | (2006.01) | |
| G06F 9/455 | (2006.01) | |
| G06F 11/14 | (2006.01) | |
| H04L 29/08 | (2006.01) | |
| G06F 11/20 | (2006.01) | |

(52) U.S. Cl.
CPC ...... G06F 9/45558 (2013.01); G06F 11/1438 (2013.01); G06F 11/1484 (2013.01); H04L 67/1027 (2013.01); G06F 11/2043 (2013.01)

(58) Field of Classification Search
CPC ............. G06F 9/45558; G06F 11/1438; G06F 11/1484; G06F 11/2043; H04L 67/1027
USPC ............................. 709/213, 204; 714/4.11, 13
See application file for complete search history.

(56) References Cited

U.S. PATENT DOCUMENTS

| | | | | |
|---|---|---|---|---|
| 5,452,448 A | * | 9/1995 | Sakuraba et al. | |
| 5,640,394 A | * | 6/1997 | Schrier et al. | 370/389 |
| 5,829,041 A | * | 10/1998 | Okamoto et al. | 711/147 |
| 5,852,724 A | * | 12/1998 | Glenn et al. | 709/239 |
| 6,202,149 B1 | * | 3/2001 | Hedegard | 713/100 |
| 6,243,825 B1 | * | 6/2001 | Gamache et al. | 714/4.4 |
| 6,360,331 B2 | * | 3/2002 | Vert et al. | 714/4.4 |
| 6,446,218 B1 | * | 9/2002 | D'Souza | 714/4.4 |
| 6,574,750 B1 | * | 6/2003 | Felber et al. | 714/20 |
| 6,609,213 B1 | * | 8/2003 | Nguyen et al. | 714/4.12 |
| 6,687,735 B1 | * | 2/2004 | Logston et al. | 709/203 |
| 6,718,383 B1 | * | 4/2004 | Hebert | 709/224 |
| 6,735,717 B1 | * | 5/2004 | Rostowfske et al. | 714/13 |
| 6,865,591 B1 | * | 3/2005 | Garg et al. | 709/201 |
| 6,938,085 B1 | * | 8/2005 | Belkin et al. | 709/227 |
| 6,944,785 B2 | * | 9/2005 | Gadir et al. | 714/4.11 |
| 7,039,827 B2 | * | 5/2006 | Meyer et al. | 714/4.11 |

(Continued)

*Primary Examiner* — Daniel C Murray
(74) *Attorney, Agent, or Firm* — Nixon Peabody, LLP; Khaled Shami

(57) ABSTRACT

The disclosed technique uses virtual machines in solving a problem of persistent state for storage protocols. The technique provides for seamless, persistent, storage protocol session state management on a server, for higher availability. A first virtual server is operated in an active role in a host system to serve a client, by using a stateful protocol between the first virtual server and the client. A second, substantially identical virtual server is maintained in a passive role. In response to a predetermined event, the second virtual server takes over for the first virtual server, while preserving state for a pending client request sent to the first virtual server in the stateful protocol. The method can further include causing the second virtual server to respond to the request before a timeout which is specific to the stateful protocol can occur.

25 Claims, 8 Drawing Sheets

(56) References Cited

U.S. PATENT DOCUMENTS

| | | | |
|---|---|---|---|
| 7,076,555 B1* | 7/2006 | Orman et al. | 709/227 |
| 7,124,171 B1* | 10/2006 | McCann | 709/216 |
| 7,137,040 B2* | 11/2006 | Bae et al. | 714/47.3 |
| 7,194,652 B2* | 3/2007 | Zhou et al. | 714/4.4 |
| 7,200,620 B2 | 4/2007 | Gupta | |
| 7,200,622 B2* | 4/2007 | Nakatani et al. | 707/823 |
| 7,210,147 B1* | 4/2007 | Hipp et al. | 719/312 |
| 7,539,760 B1* | 5/2009 | Petry et al. | 709/227 |
| 7,546,431 B2* | 6/2009 | Stacey et al. | 711/165 |
| 7,590,727 B1* | 9/2009 | Barnes | 709/224 |
| 7,640,451 B2* | 12/2009 | Meyer et al. | 714/4.11 |
| 7,818,408 B1* | 10/2010 | Ignatuk et al. | 709/221 |
| 8,046,731 B2* | 10/2011 | Sabev et al. | 717/102 |
| 8,078,622 B2* | 12/2011 | Rabii et al. | 707/737 |
| 8,250,166 B1* | 8/2012 | Barnes | 709/213 |
| 8,335,943 B2* | 12/2012 | Kamath et al. | 714/4.1 |
| 8,412,672 B1* | 4/2013 | Radhakrishnan et al. | 707/609 |
| 8,442,948 B2* | 5/2013 | Middlecamp et al. | 707/662 |
| 8,484,242 B1* | 7/2013 | Singh et al. | 707/770 |
| 8,543,554 B1* | 9/2013 | Singh et al. | 707/690 |
| 8,583,867 B1* | 11/2013 | Radhakrishnan et al. | 711/114 |
| 8,717,167 B2* | 5/2014 | Ohtani | G05B 9/02 340/506 |
| 8,819,339 B2* | 8/2014 | Radhakrishnan | G06F 3/0614 711/114 |
| 8,959,220 B2* | 2/2015 | Frey | G06F 9/5077 709/224 |
| 9,077,579 B1* | 7/2015 | Chu | G06F 9/468 |
| 2003/0018927 A1* | 1/2003 | Gadir et al. | 714/4 |
| 2003/0088615 A1* | 5/2003 | Good et al. | 709/203 |
| 2003/0088656 A1* | 5/2003 | Wahl et al. | 709/223 |
| 2004/0010583 A1* | 1/2004 | Yu et al. | 709/224 |
| 2004/0210795 A1* | 10/2004 | Anderson | 714/6 |
| 2004/0230619 A1* | 11/2004 | Blanco et al. | 707/200 |
| 2005/0038831 A1* | 2/2005 | Souder et al. | 707/201 |
| 2005/0071389 A1* | 3/2005 | Gupta | 707/204 |
| 2005/0283636 A1* | 12/2005 | Vasudevan et al. | 714/2 |
| 2006/0015773 A1* | 1/2006 | Singh et al. | 714/13 |
| 2006/0101130 A1* | 5/2006 | Adams et al. | 709/218 |
| 2006/0212481 A1* | 9/2006 | Stacey et al. | 707/104.1 |
| 2007/0180302 A1* | 8/2007 | Allen et al. | 714/6 |
| 2007/0255716 A1* | 11/2007 | Sabev et al. | 707/10 |
| 2008/0104216 A1* | 5/2008 | Ponnappan et al. | 709/223 |
| 2010/0114889 A1* | 5/2010 | Rabii et al. | 707/737 |
| 2010/0325485 A1* | 12/2010 | Kamath et al. | 714/15 |
| 2013/0232181 A1* | 9/2013 | Radhakrishnan et al. | 707/827 |
| 2014/0040547 A1* | 2/2014 | Radhakrishnan | G06F 3/0614 711/114 |

* cited by examiner

SEAMLESS TAKEOVER OF A STATEFUL PROTOCOL SESSION IN A VIRTUAL MACHINE ENVIRONMENT

FIELD OF THE INVENTION

At least one embodiment of the present invention pertains to network storage systems, and more particularly, to a technique for seamless takeover of a stateful storage protocol session in a virtual machine environment.

BACKGROUND

Network storage is a common technique for, making large amounts of data accessible to multiple users, archiving data and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

Various protocols can be used to implement network storage. These include a number of "stateful" storage protocols that have gained market adoption and popularity. A "stateful" protocol is a protocol in which the server needs to maintain per-client session state information (hereinafter simply called "session state" or "state") at least until the applicable session has ended. Session state may include the following information elements, for example: client network information (Internet Protocol (IP) addresses, Transmission Control Protocol (TCP) ports, client protocol version, protocol features available at client side), authentication information, open filesystems metadata, open files metadata, per-file locking/synchronization metadata (e.g., needed for maintaining consistency of file data while two different clients are sharing the file).

Prominent among the popular stateful storage protocols are the Common Internet File System (CIFS) protocol and Network File System (NFS) version 4 (NFSv4) protocol. CIFS is currently the most popular NAS protocol among Microsoft® Windows® based datacenters. Because the system needs to maintain per-client session state on the server, the amount of memory and complexity required to implement stateful protocols tends to be higher from the server standpoint than for stateless protocols.

Stateful protocols also suffer from a distinct disadvantage in the event of server failures. Since the session information is critical for the client to get undisrupted access to storage, in the event of a server failure the session information gets purged, leading to lack of availability of storage resources to the client. Once the server reboots, the client is forced to detect the reboot and re-establish the session anew. After the new session is established, the client has to perform initialization packet exchanges, which contributes to additional delays.

Most NAS storage protocols, including the stateful ones, are based on a request-response methodology. The client makes a request and expects a response within a specified amount of time. If the client does not receive a response within the specified time, it tries to retransmit for a limited number of times before it deems the server to be unavailable. If the server is able to respond within the timeout interval, the client is able to continue with the interaction without major changes.

In the context of server failures, the server needs to be able to restart and come to a state where it can respond to the client in a coherent manner. With current storage server system designs, a server failure (e.g., a hardware failure or software panic) leads to a reboot of the system. After the reboot, the hardware initialization, especially the assimilation of disks belonging to the system, takes an inordinate amount of time relative to the protocol timeout limit. The client likely will have terminated the server session, leading to disruption at the application level on the client.

SUMMARY

This summary is provided to introduce in a simplified form certain concepts that are further described in the Detailed Description below. This summary is not intended to identify essential features of the claimed subject matter or to limit the scope of the claimed subject matter.

The technique introduced here uses virtual machines (VMs) in solving the problem of persistent state for storage protocols. In particular, the technique provides for seamless, persistent, storage protocol session state management on the server side, leading to higher availability.

In certain embodiments, with the use of a hypervisor, storage server functionality is encapsulated in VMs. For each active storage server VM in a given system, another passive, clone VM, similar in functionality to the active virtual storage server, is instantiated. The clone VM is fully initialized and shares all of the memory pages of the active VM but does not actively serve clients; i.e., in steady state it is in quiescent (passive) mode. In the event of a failure of the active VM, the clone VM is activated and imports the storage protocol sessions of the active VM and starts responding to client requests with very little downtime or service unavailability.

Thus, the technique introduced here includes, in one embodiment, the use of a clone VM as backup for an active VM, where the backup VM is pre-initialized (i.e., initialized before being needed) and maintained in the same state as the active VM before there is any need for a takeover by the backup VM. Further, in certain embodiments this is done by use of memory sharing between the active and clone VM, thus avoiding any need to copy data between them.

In one embodiment, the technique introduced here provides a method that includes operating a first virtual server (a type of VM) in an active role in a host processing system to serve a client, by using a stateful protocol between the first virtual server and the client; associating a second virtual server (also a type of VM) in a passive role with the first virtual server; and in response to a predetermined event, causing the second virtual server to take over the active role from the first virtual server, while preserving state for a pending client request sent to the first virtual server in the stateful protocol. The method can further include causing the second virtual server, acting in the active role, to respond to the request before a request timeout specified by the stateful protocol can occur. In this way, takeover by the second virtual server for the first virtual server can be made transparent to the client which sent the pending request.

Additionally, in one embodiment the method includes sharing state between the first and second virtual servers prior to the predetermined event, by sharing a designated region of memory between the first and second virtual servers, wherein prior to the predetermined event the first virtual server has read-write permission to access the region of memory and the second virtual server has read-only permission to access the region of memory. The method can further include maintaining state for client requests, conforming to the stateful protocol, in the designated region of the memory, prior to the predetermined event. The act of causing the second virtual server to take over the active role from the first virtual server can include changing permission of the second virtual server to access the region of memory from read-only to read-write. It can further include assigning to the second virtual server a network address associated with the first virtual server, and/or updating a host memory page table and a guest memory page table. The first and second virtual servers can be virtual network storage servers.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings.

DETAILED DESCRIPTION

Figure 1:
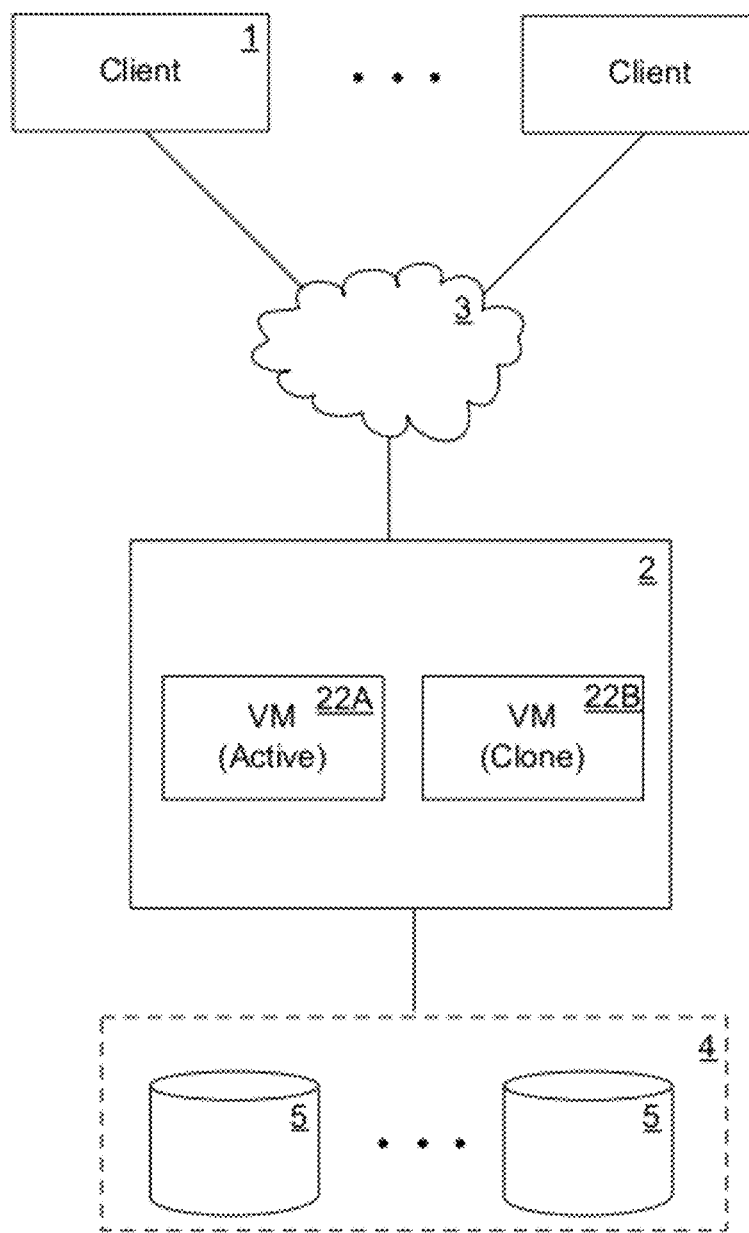
FIG. 1 shows a network storage environment based on VMs.

Virtualization is a technique commonly used to improve the performance and utilization of computer systems, particularly multi-core/multi-processor computer systems. In a virtualization environment, multiple VMs can share the same physical hardware, such as processors/cores, memory and input/output (I/O) devices. A software layer called a hypervisor can provide the virtualization, i.e., virtualization of physical processors, memory and peripheral devices. Hypervisors provide the ability to run functionality in well-encapsulated containers, i.e., in VMs. Many different technologies are known and available today for providing hypervisor is and, more generally, virtualization environments, such as technology from VMWare®, for example.

The time needed to start, suspend and stop a VM is much smaller than that of a real (physical) machine. Moreover, resources can be added to or removed from a running VM quickly and efficiently. Therefore, running a hypervisor on the physical storage system and running core storage server functionality inside a VM provides a number of advantages. Since a storage server VM (i.e., a virtual storage server) can be activated (resumed/restarted) in a small amount of time, resiliency against service disruptions can be provided to clients.

The description that follows explains a technique to leverage VMs to solve the problem of persistent state for network storage protocols. Nonetheless, the technique can be extended to apply in other contexts. In the embodiments described herein, a hypervisor is incorporated into a processing system in order to encapsulate network storage server functionality in VMs and thereby into distinct fault domains. If one storage server VM (virtual storage server) suffers from a software panic or other software related failure, the other VMs in the processing system are not affected and continue to function.

As described in greater detail below, in the technique introduced here a host processing system runs a number of storage server VMs that provide access to storage to network clients via a stateful storage protocol, such as CIFS and NFSv4. Note that in other embodiments, the technique introduced here can be extended to apply to environments and protocols other than those related to network storage. Each storage server VM has a dedicated set of hardware storage resources, such as Small Computer Systems Interface (SCSI) disks (via host-bus adapters). In addition, each storage server VM is supplied with memory and processor resources by the hypervisor. The processor and memory resources are shared with other VMs on the same physical processing system. In addition, the hypervisor exports an interface that provides the ability to share memory pages between VMs.

At the time of initialization of a storage server VM, a clone VM that is similar to the storage server VM in essentially every significant respect is also initialized. The clone VM remains passive (quiescent), however, while the active VM functions normally. In one embodiment, each VM is initialized with a boot parameter that defines its functionality, active or passive/clone, where the boot parameter of the clone VM has a value different than that of the boot parameter for the active server VM. The clone VM runs the same storage server software stack as the active storage server VM. However, the boot parameter causes the clone VM to behave differently once it boots. The active storage server VM assimilates its dedicated storage devices (e.g., disks) via the hypervisor, and exports the storage protocols via well-defined network Transmission Control Protocol/Internet Protocol (TCP/IP) ports and IP addresses. For an external client, there is no difference in interaction between a physical storage system and a storage server VM.

On the other hand, the clone VM, as soon as it is initialized, does not own any storage devices (e.g., disks). It imports all of the memory pages of the active storage server VM to its address space. However, the memory pages are maintained as read-only by the clone VM after the import is complete. The clone VM does not do any network initialization and, hence, does not interact with any client. However, in one embodiment the clone VM does start a background thread, the sole purpose of which is to interact with the active storage server VM (hereinafter simply "active VM") periodically via messages to determine if it is operational and serving data. In such an embodiment, the clone VM is suspended after initialization and is woken up periodically via the timer interrupt. The interrupt in turn wakes up the background thread. During normal operation, the clone VM consumes very little processor cycles in order to function. Moreover, the memory footprint of the clone VM is minimal, since the memory pages are shared with the active VM.

In the event of a failure of the active VM, the clone VM's periodic message would not be responded to by the server VM. In that case, the clone VM performs a series of actions that enable it to take over functionality from the active VM. These include, generally: 1) taking over ownership of dedicated hardware resources (e.g., disks and/or other storage devices) from the (failed) active VM; 2) checking the per-client storage protocol session state (via the mapped shared memory) for consistency and correctness (in this step, the clone VM identifies all of the sessions that can be resurrected); 3) taking over the IP address of the active VM and exporting the storage protocols on the corresponding ports; and 4) looking at outstanding client requests and responding to them, if possible.

Since initialization of the clone VM has already been done prior to the failure, the steps outlined above are essentially all of the significant activity that needs to be done in order for a takeover by the clone VM to occur. Moreover, the whole process can be completed quickly, often before any client request times out. Where the clone VM is able to respond to a client before its request times out, the client will perceive little or no service disruption. Hence, there is no need to reestablish client sessions when using a stateful protocol (e.g., CIFS or NFSv4). Further, the relatively short takeover time can satisfy the client response timeout as outlined in the stateful protocol (CIFS or NFSv4), thereby enabling higher availability of the storage service. In addition, it allows greater applicability in certain real-time environments.

This seamless takeover by the clone VM in the event of server software failures enables high-availability to the storage system's exported storage. Additionally, there is no change in storage protocol needed in order to achieve higher availability; legacy clients can be supported by this mechanism. Of course, in case of certain irrecoverable failures (e.g., hardware failure or hypervisor failure), this technique would not be effective; nonetheless, because server software failures are a major cause for storage disruption in datacenters, the technique introduced here is still advantageous.

FIG. 1 shows a network storage environment, based on the use of VMs, in which the technique introduced here can be implemented. In FIG. 1, a host processing system 2 is coupled to a storage subsystem 4 that includes non-volatile mass storage devices 5, and to a set of storage clients 1 through an interconnect 3. Although the storage subsystem 4 is illustrated as separate from host processing system 2 in FIG. 1, the storage subsystem 4 in some embodiments may be physically part of the host processing system 2. The interconnect 3 may be, for example, a local area network (LAN), wide area network (WAN), metropolitan area network (MAN), global area network such as the Internet, a Fibre Channel fabric, or any combination of such interconnects. The host processing system 2 may be, for example, a conventional personal computer (PC), server-class computer, workstation, handheld computing/communication device, or the like. Likewise, each of the clients 1 may also be any suitable type of processing system or device, such as those mentioned above.

Running on the host processing system 2 are an active VM 22A and a clone VM 22B, which are virtual storage servers in one embodiment. The clone VM 22B is essentially identical to the active VM 22A, except that the clone VM 22B remains passive as long as active VM 22A operates normally. The active VM 22A and clone VM 22B are normally predesignated as such (i.e., as active or passive) prior to initialization of the host processing system 2. The active VM 22A manages storage of data in the storage subsystem 4 on behalf of clients 1. The active VM 22A receives and responds to various read and write requests from the clients 1, directed to data stored in or to be stored in the storage subsystem 4. The internal structure of each VM 22A and 22B is not germane to the technique introduced here, nor is the specific functionality of either VM germane beyond what is described herein.

Note that while only two VMs are shown in FIG. 1, embodiments of the technique introduced here can include more than two VMs in a physical host processing system. In general, for each active VM there will be a corresponding passive clone VM, according to the technique introduced here. Furthermore, note that the clone VM 22B is shown to be in the same host processing system 2 as the active VM 22A; this arrangement facilitates the sharing of memory between the two VMs. However, in an alternative embodiment the clone VM 22B could be in a separate host processing system from the active VM 22A, if some mechanism is provided to allow the sharing of memory between the two VMs. In one such alternative embodiment, the session state can be replicated over a network link between two server instances. This alternative embodiment will entail higher latencies for the client responses than the embodiment described above (since a response cannot be sent unless the replication is complete), and memory will be consumed at both server instances to maintain the sessions' state. However, it has the advantage that if the host processing system for the active VM fails, the clone VM will still be available.

The mass storage devices 5 in the storage subsystem 4 can be, for example, conventional magnetic or optical disks or tape drives; alternatively, they can be non-volatile solid-state memory, such as flash memory or solid-state drives (SSDs). The mass storage devices 5 can be organized as a Redundant Array of Inexpensive Devices (RAID), in which case the storage server 2 accesses the storage subsystem 4 using one or more well-known RAID protocols.

Each VM 22A or 22B may be operable as a file-level server such as used in a NAS environment, or as a block-level storage server such as used in a SAN environment, or as a storage server which is capable of providing both file-level and block-level data access. Further, although each VM 22A or 22B is illustrated as a single unit in FIG. 1, it can have a distributed architecture. For example, VM 22A or 22B each can include a physically separate network module (e.g., "N-blade") and data module (e.g., "D-blade") (not shown), which communicate with each other over an external interconnect.

Figure 2A:
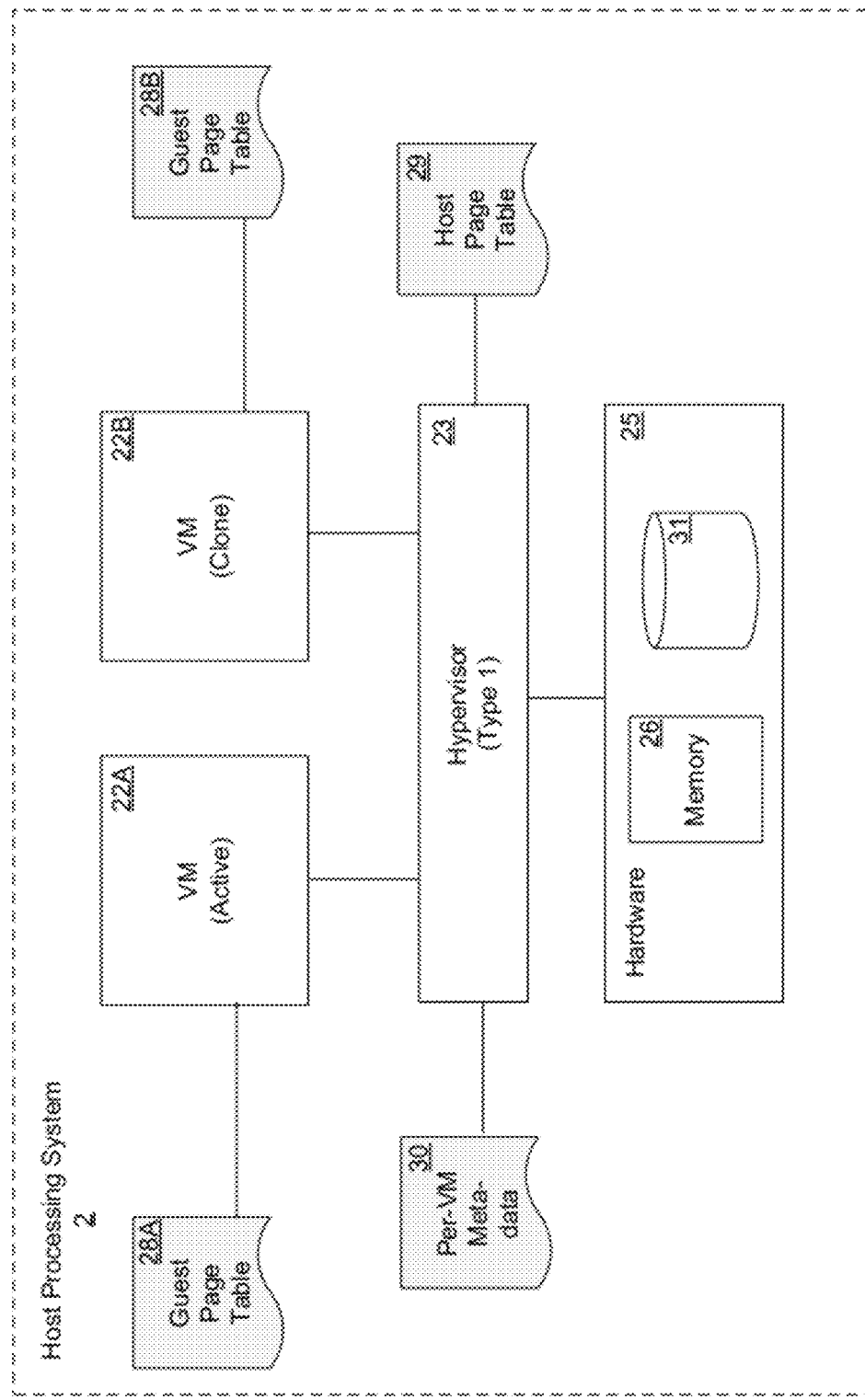
FIGS. 2A and 2B show more detailed illustrations of the elements in the host processing system, according to two different embodiments.
Figure 2B:
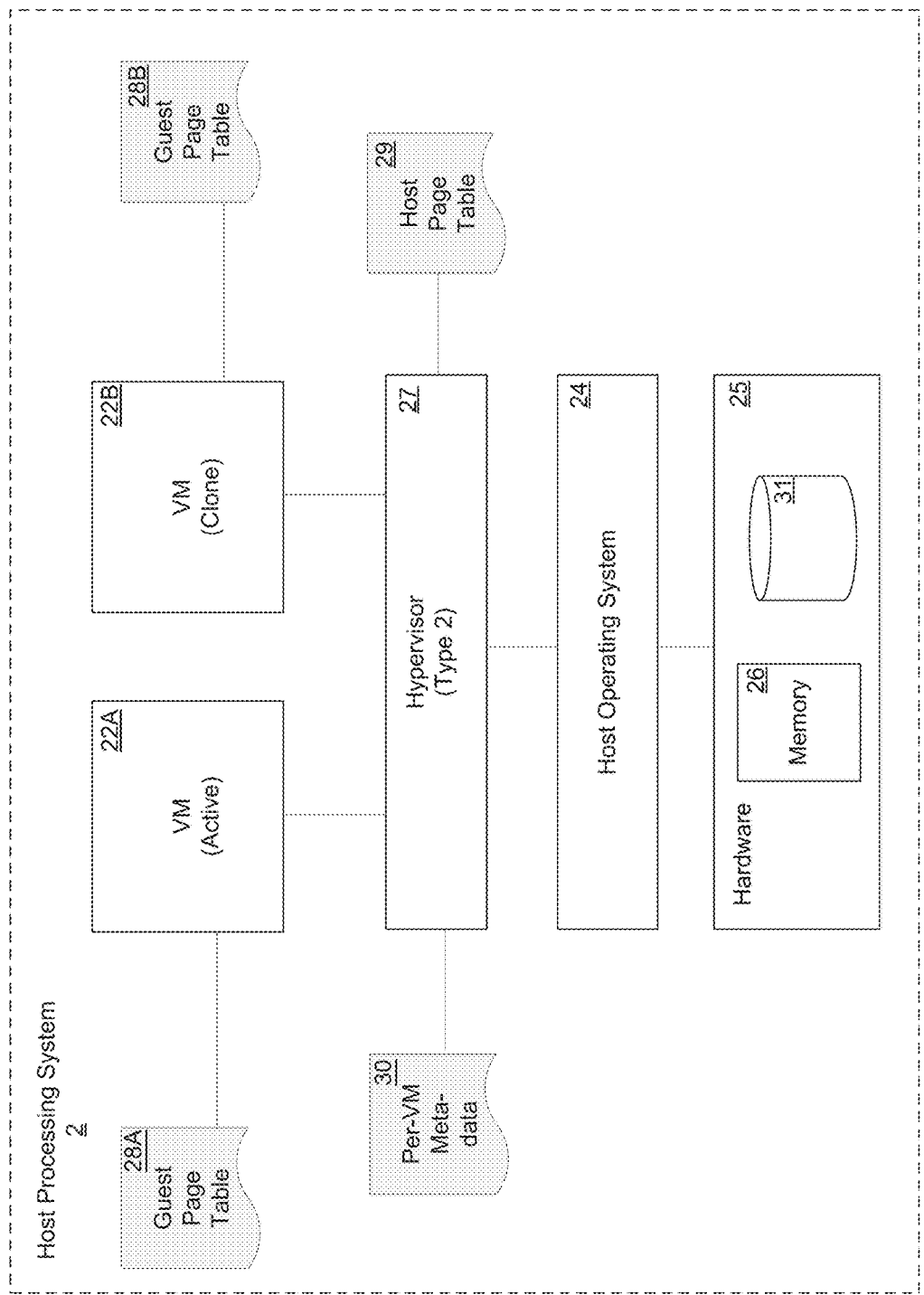

FIGS. 2A and 2B each show a more detailed illustration of the elements in the host processing system 2. In the embodiment of FIG. 2A, VM 22A and VM 22B each operate logically on top of a "type 1" hypervisor 23, which in turn runs directly on top of the hardware. In an alternative embodiment, shown in FIG. 2B, the hypervisor 27 is a "type 2" hypervisor, which operates logically on top of host operating system (OS) software 24, which in turn operates logically on top of the hardware 25 of the host processing system 2. In the following description, references to "the hypervisor" or "hypervisor 23" should be understood to be equally applicable to hypervisor 27, and vice versa, unless otherwise specified.

The host OS software 24 (if present) can be any conventional OS software that is compatible with a virtualization environment, such as a Windows® or Linux® based OS. The hardware includes 25, for example, a memory 26 and one or more mass storage devices 31, such as disks, solid-state memory, or the like. At least a portion of memory 26 is shared by VM 22A and VM 22B. The sharing of memory 26 is facilitated by the hypervisor 23.

VM 22A and VM 22B each maintain their own guest page table 28A or 28B, respectively, which contains a listing of the memory pages in memory which are owned by that VM and the applicable permissions, i.e., read write or read-only.

Additionally, the hypervisor 23 maintains a host page table 29, which contains a listing of all of the memory pages in memory 26, the owner of each memory page (e.g., VM 22A or VM 22B). Further, for each VM in the host processing system 2, the hypervisor 23 maintains a separate ("per-VM") metadata set 30 containing metadata about the memory used by that VM, such as the number of physical pages allocated to the VM, etc.

The active VM 22A normally maintains state information for client requests in the shared portion of memory 26. A number of modifications can be made to a conventional VM architecture in order to enable this to happen. First, based on the number of active stateful sessions that can be supported, the system needs to assess the total amount of memory required to maintain the state of all those sessions. This should be a whole number of memory pages, which will be shared with the clone VM 22B a priori via the hypervisor 23. This step can be during the initialization stage of the active VM 22A. The clone VM 22B may need to be running at that time for the sharing operation to be complete, as described further below. This sharing operation, therefore, might require coordination with the hypervisor 23.

In one embodiment, the hypervisor 23 is notified of the clone VM 22B and its relation to the active VM 22A. If the hypervisor 23 supports the ability to transfer ownership of memory pages and resources from the active VM 22A to the clone VM 22B in the event of a failure of the active VM 22A, then the appropriate association between the two VMs needs to be made explicit to the hypervisor 23.

Once the active VM 22A has shared an integral number of pages with the clone VM 22B, the memory allocation associated with the state of stateful protocol sessions is managed carefully. In one embodiment, this involves limiting the shared pages to a designated memory allocation area in memory 26. Each time a stateful protocol session is created in this embodiment, all memory allocations belonging to this session, i.e., the session's state, have to come from this special memory allocation area. Session state may include the following elements, for example: client network information (IP addresses, TCP ports, client protocol version, protocol features available at client side), authentication information, open filesystems metadata, open files metadata, per-file locking/synchronization metadata (e.g., needed for maintaining consistency of file data while two different clients are sharing the file).

Hence, the memory allocation functionality in each VM 22A, 22B needs to have the capability to recognize and implement semantic association between memory allocations. Since all per-session state information is kept in memory, when a particular session state element is introduced, memory allocation would be performed to allocate space to store the element. With the technique introduced here, all state information belonging to a particular session is allocated within close proximity, e.g., within one memory page or contiguous memory pages. This enables identifying, verifying, resurrecting state for a particular session simpler in the event of a takeover. Note that in existing implementations, memory allocation usually is based on size and allocations can happen on any page. The mechanism introduced here, therefore, modifies the conventional methodology so that exceptions may be made when allocating memory for session state.

In the event of a failure of the active VM 22A, the hypervisor 23 facilitates a change in the ownership of the session state information in the shared portion of memory 26, from the (failed) active VM 22A to the clone VM 22B (which then becomes the active VM). To enable this, the hypervisor 23 maintains the host page table 29, which includes a map of each guest VM's memory pages to the actual physical system pages that are allocated. Typically, the map would contain <Guest Physical page>-to-<Machine Physical Page> mappings. Modifications to the host page table 29, i.e., inserting, removing or modifying entries, is done by the hypervisor 23. However, during runtime, since lookups to these mappings are used very frequently, the lookup function can be implemented by a hardware memory management unit (MMU) 76 of the host processing system 2 (see FIG. 7), which can perform lookups faster. As noted above, the hypervisor 23 also maintains per-VM metadata, i.e., metadata set 30.

In addition, each VM 22A or 22B maintains in its corresponding guest page table 28A or 28B, respectively, the <Guest Virtual page>-to-<Guest Physical page> mappings. In one embodiment a VM makes modifications to its own guest page table 28, via the hypervisor 23. Page table modifications can be made via instructions in a VM 22A or 22B. When a VM 22A or 22B executes those instructions, a trap is generated into the hypervisor 23 (though the VM may be unaware of this). The hypervisor 23 makes an appropriate change in the host page table 29 before letting modification the guest page table 28A or 28B succeed.

Each guest page table mapping entry also contains the permissions that the associated VM has on a particular page, i.e., read-write or read-only. Also, each page's metadata (maintained by the hypervisor 23) contains information about whether the associated VM owns the page or not. A VM can only share pages that it owns with another VM.

In one embodiment, a memory page can be shared between VMs by using, for example, an appropriate paravirtualization application programming interface (PV-API) provided by the hypervisor 23. Such a PV-API may input, for example, the remote VM's identifier (ID), physical page address and type of permission to be granted while sharing (read-only or read-write). With these parameters, the hypervisor in at least one embodiment can enable the sharing between the VMs.

When a page is shared between VMs, the hypervisor 23 makes appropriate modifications in the host page table 29 (since a page can be accessed via two different guest physical addresses). Then the VM calling the PV-API makes the appropriate changes to its guest page table (e.g., 28A or 28B) when the API returns successfully.

Figure 3:
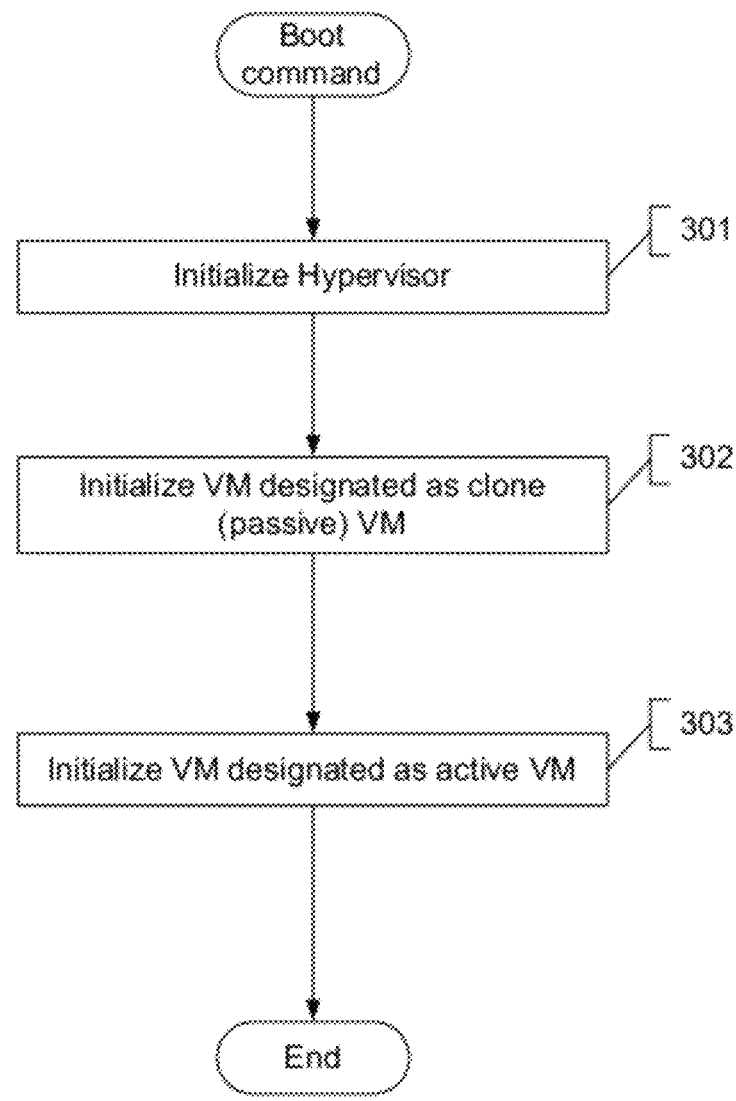
FIG. 3 illustrates an example of a process for initialization (boot-up) of the host processing system.

FIGS. 3 through 6 illustrate examples of various processes associated with the technique introduced here. In particular, FIG. 3 illustrates an example of a process for initialization (boot-up) of the host processing system 2. The example of FIG. 3 assumes an embodiment that uses a type 1 hypervisor 23 (i.e., no host OS 24), although it easily can be adapted to an embodiment that uses a type 2 hypervisor. In response to a boot command, the host processing system 2 at step 301 initializes its hypervisor 23. The hypervisor 23 then at step 302 initializes the VM that has been predesignated as the clone VM, e.g., VM 22B in FIG. 2. In an embodiment which uses a type 2 hypervisor 27 (i.e., there is a host OS 24), the host OS 24 would first be initialized, followed by initialization of the hypervisor 27.

As noted above, the clone VM 22B is initialized first to facilitate the memory sharing operation described above. Also as noted above, the clone VM 22B can be identified from a preset boot parameter, which may be stored at a predetermined location on disk along with other metadata associated with that VM. The boot parameter can be a simple binary value, e.g., '1' for active or '0' for passive. Once the clone VM 22B has been initialized, the hypervisor 23 then at step 303 initializes the other VM 22A, which has been predesignated as the active VM.

Figure 4:
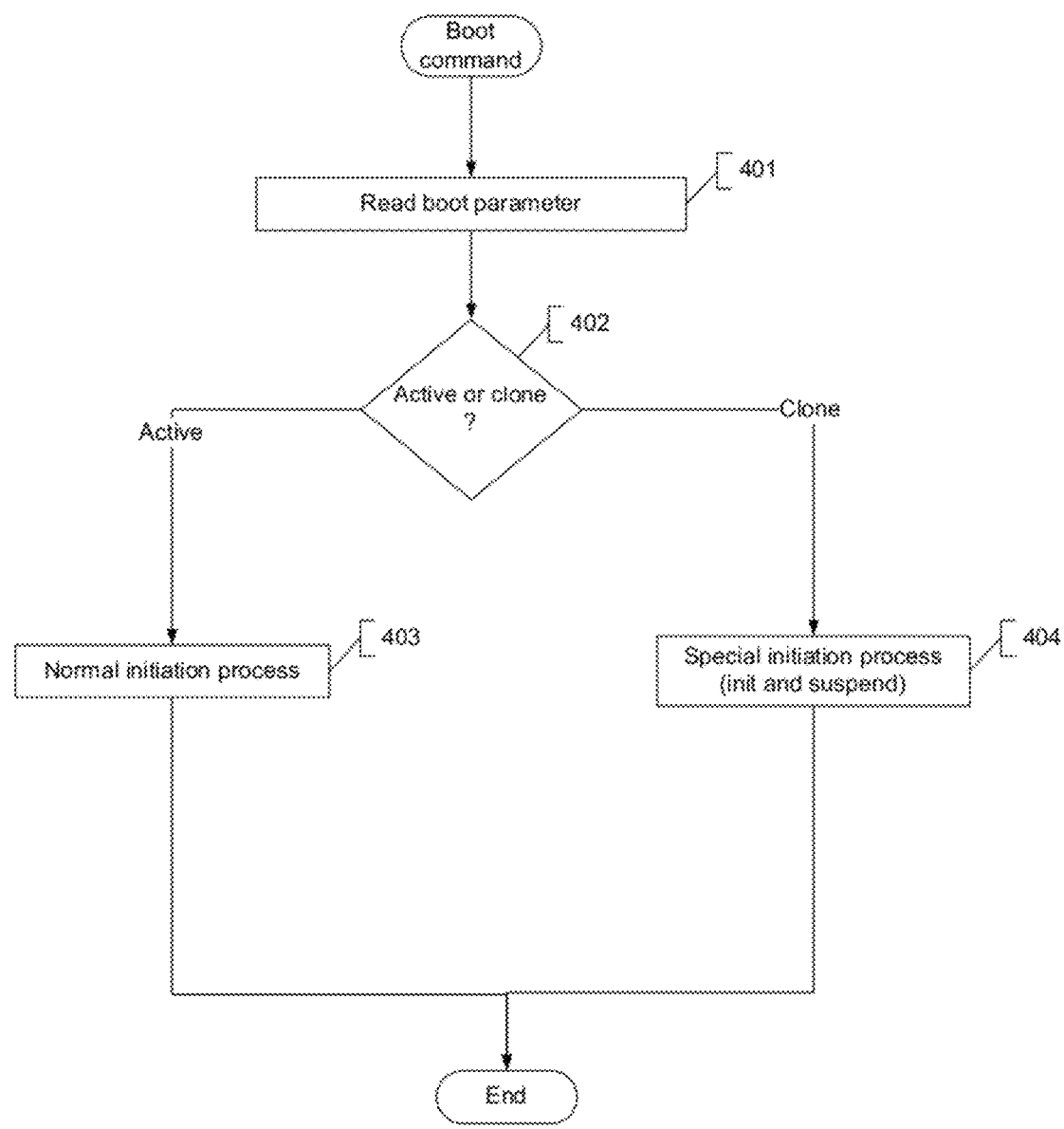
FIG. 4 illustrates an example of process of initializing a VM in connection with the technique introduced here.

FIG. 4 illustrates an example of process of initializing a VM in the environment described above. In response to a boot command directed to a given VM, the VM reads the above-mentioned boot parameter at step 401. From the boot parameter, the VM determines at step 402 whether it is the active VM on the clone VM. If it is the active VM, then it proceeds to step 403, where it proceeds with its normal initialization process. The initialization process for the active VM includes sharing memory pages with the clone VM in the manner described above. The remainder of the initialization process can include common, well-known initialization steps that are not germane to the technique being introduced here.

If, on the other hand, the VM determines at step 402 that it is the clone VM, then it instead proceeds to step 404, where it performs a special initialization process. The special initialization process includes initializing normally but then suspending all operation except for certain operations related to monitoring the status of the active VM. In one embodiment this includes the clone VM starting a background thread to monitor the status of the active VM. The special initialization process also includes the clone VM notifying the hypervisor 23 of its presence and its relationship to the active VM.

Figure 5:
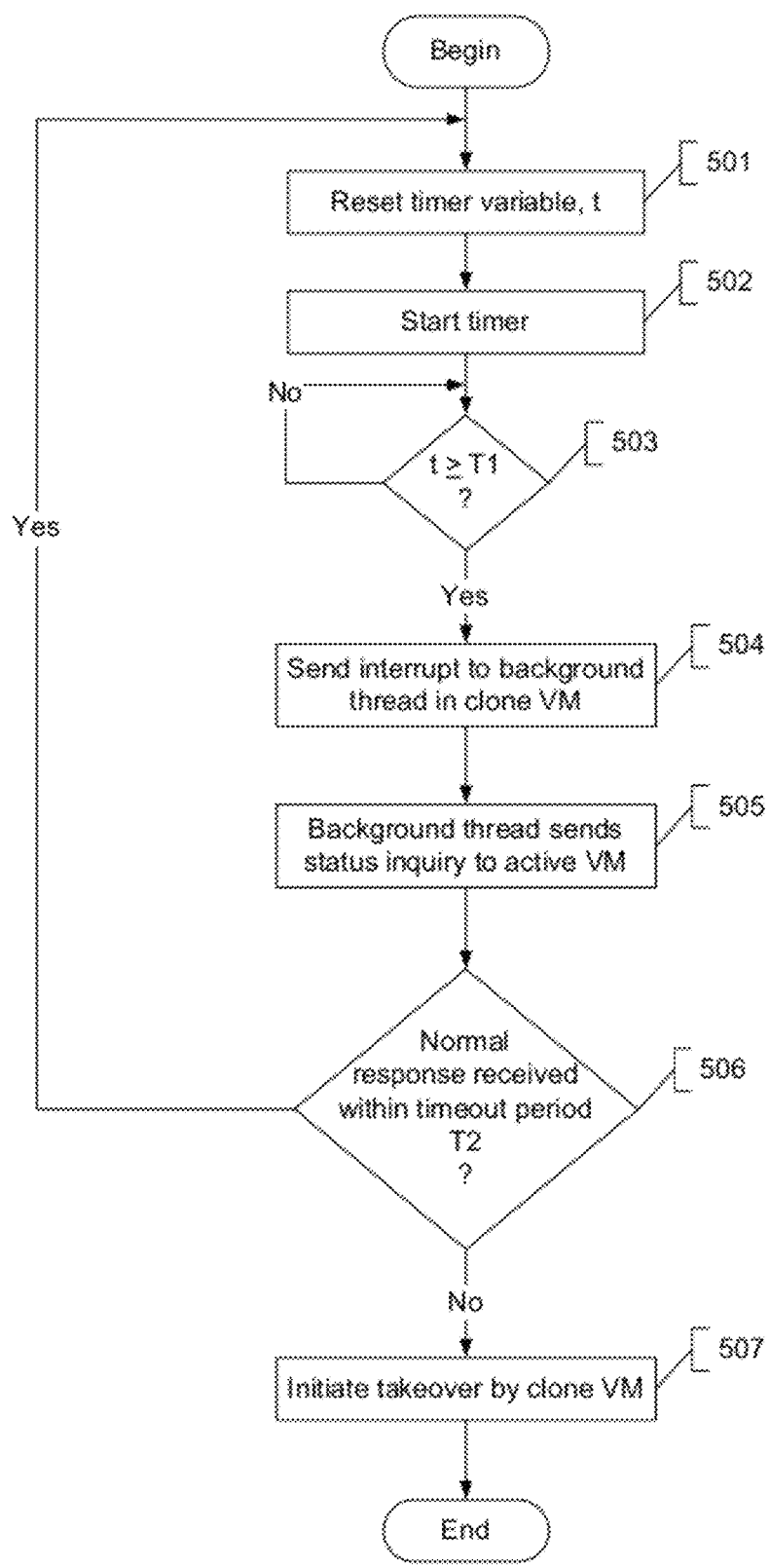
FIG. 5 illustrates an example of a process by which an active VM is monitored to determine when a takeover by a passive clone VM is appropriate.

FIG. 5 illustrates an example of a process by which the active VM 22A is monitored to determine when a takeover by the clone VM 22B is appropriate. Initially at step 501 a process of the host OS 24 (if there is a host OS) or the hypervisor 23 (if there is no host OS) resets a timer variable, t. A timer process operating on the variable t is then started at step 502. At 503 the host OS or hypervisor process determines whether the timer variable t equals or exceeds a predetermined timeout value, T1. Step 503 repeats until the outcome of that determination is affirmative.

When t has equaled or exceed the timeout value T1, the host OS process (if present) or hypervisor at step 504 sends an interrupt to a background thread of the clone VM 22B to cause that background thread. In response to that interrupt, at step 505 the background thread sends a status inquiry to the active VM 22A. At step 506 the background thread of the clone VM 22B determines whether it has received a normal response to that inquiry from the active VM 22A before expiration of another, predetermined timeout period, T2. If the outcome of that determination is affirmative, the process loops back to step 501 and repeats. If the outcome is negative, this indicates that some sort of failure of the active VM 22A has occurred; in that event, at step 507 the background thread triggers the clone VM 22B to initiate the takeover process, an example of which is described in more detail in FIG. 6.

Figure 6:
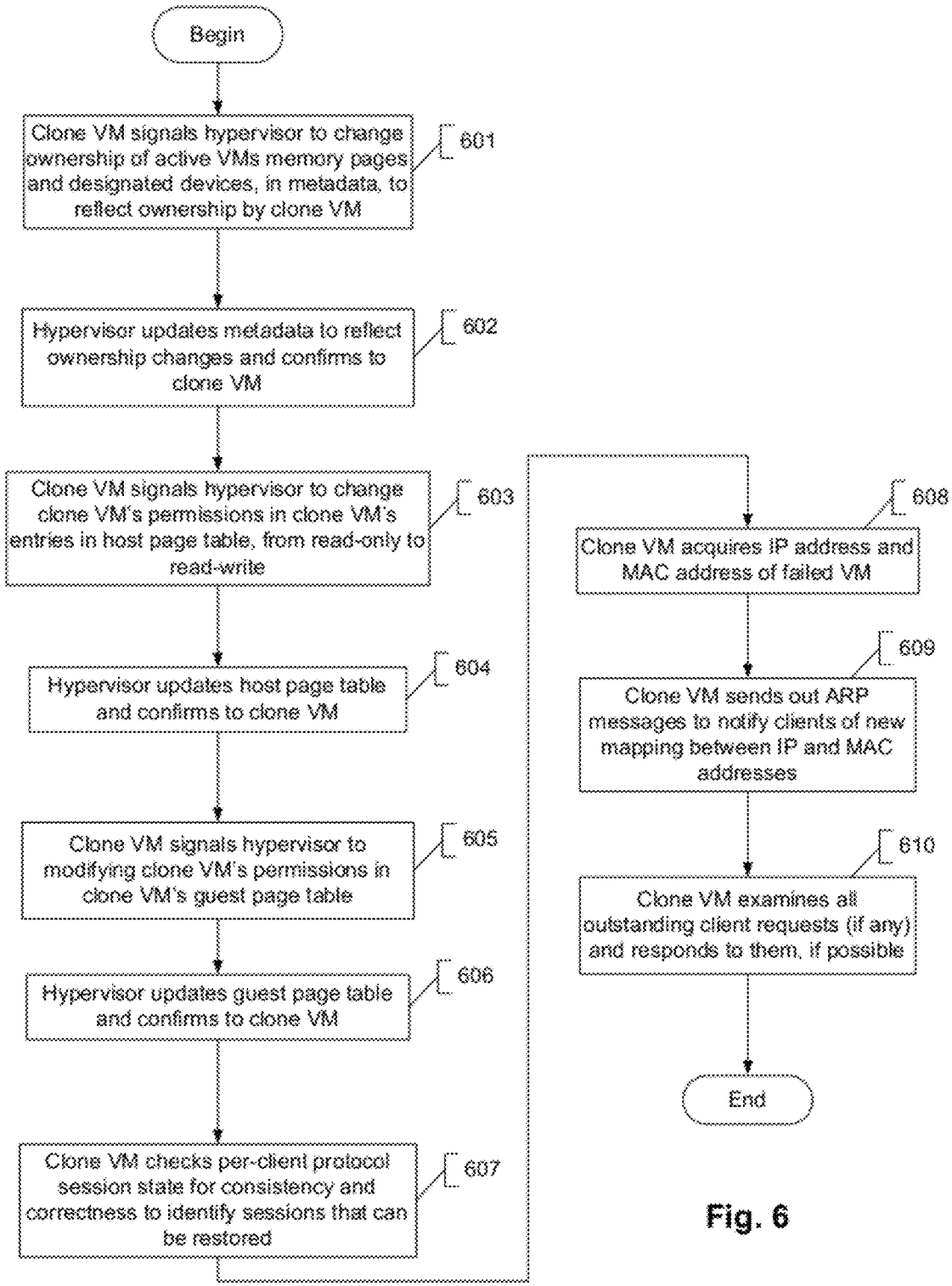
FIG. 6 shows an example of a process of takeover for a failed active VM by a clone VM.

Referring to FIG. 6, the takeover process begins at step 601, where the clone VM 22B signals the hypervisor 23 to change ownership of the active VM's memory pages in the host page table 29 and for designated hardware devices (e.g., disks) in metadata, to indicate that these resources are now owned by the clone VM 22B. At step 602, the hypervisor 23 executes this operation and provides confirmation of completion to the clone VM 22B. Next, at step 603 the clone VM 22B signals the hypervisor 23 to change its permissions for the clone VM's page table entries in the host page table 29 from read-only to read-write. At step 604, the hypervisor 23 executes this operation and provides confirmation of completion to the clone VM 22B. At this point, the clone VM 22 be can be considered to be the active VM.

At step 605, the clone VM 22B modifies its permissions in its guest page table 28B to reflect read-write permission for the memory pages it has been sharing with VM 22A. At step 606, the hypervisor 23 executes this operation and provides confirmation of completion to the clone VM 22B. At step 607, the clone VM 22B checks its per-client protocol session state of all sessions (in the shared portion of memory 26) for consistency and correctness to determine which sessions can be restarted. This may include verifying that the session fields contain valid values, to protect against memory corruptions that may occur in the event of failure of the active VM 22A. The clone VM 22B then acquires the IP address of the failed VM 22A at step 608. The clone VM 22B then sends out unsolicited Address Resolution Protocol (ARP) messages at step 609 to notify clients of the new mapping between IP and MAC addresses. Finally, at step 610 the clone VM 22B examines all outstanding (uncompleted) client requests, if any, and responds to them, if possible, by using the associated session state saved in the shared portion of memory 26.

Because this takeover process can be completed very quickly upon detection of a failure event, it is likely that any outstanding client requests will not have timed out yet, and that the request completion by the clone VM 22B will be seamless from the perspective of the clients.

Note that the above described process also involves a similar change in the metadata maintained by the hypervisor 23 for hardware devices (e.g., disks), to reflect change in their ownership from the (failed) active VM 22A to the clone VM 22B; however, for simplicity of illustration these metadata structures are not shown.

Figure 7:
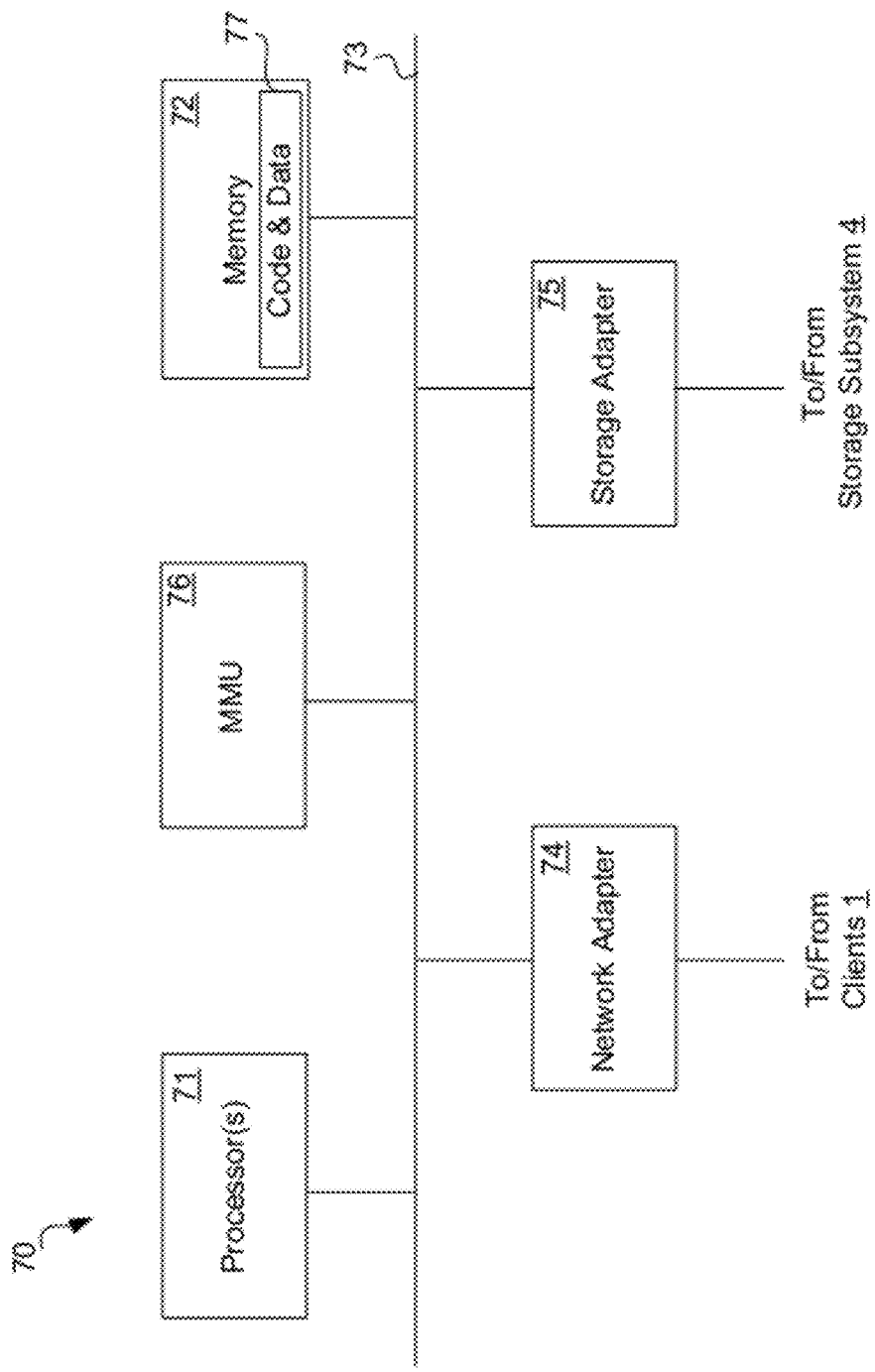
FIG. 7 is a high-level block diagram showing an example of the hardware architecture of the host processing system.

FIG. 7 is a high-level block diagram showing an example of the hardware architecture of the host processing system. The host processing system 2 in the illustrated embodiment includes a processor subsystem 71 that includes one or more processors or cores, memory 72 and a memory management unit (MMU) 76, each coupled to an interconnect 73. The interconnect 73 is an abstraction that represents any one or more separate physical buses, point-to-point connections, or both connected by appropriate bridges, adapters, or controllers. The interconnect 73, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 ("Firewire") bus.

The processor(s) 71 may be or include the central processing unit(s) (CPU(s)) of the host processing system 2 and, thus, control the overall operation of the host processing system 2. In certain embodiments, the processor(s) 71 accomplish this by executing software and/or firmware (code and data) 77 stored in memory, such as memory 72. Each processor 71 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 72 is or includes the main memory (working memory) of the host processing system 2. The memory 72 represents any form of random access memory (RAM), read-only memory (ROM), flash memory (as discussed above), or the like, or a combination of such devices. In use, the memory 72 may contain, among other things, software and/or firmware code and data 77 to cause operations such as described above be performed. This can include code for implementing the VMs and their above-described functionality. MMU 76 manages memory access operations (e.g., reads and writes) on memory 72 on behalf of the processor (s) 71 and possibly other devices.

Also connected to the processors 71 through the interconnect 73 are, in the illustrated embodiment, a network adapter 74 and a storage adapter 75. The network adapter 74 provides the processing system 70 with the ability to communicate with remote devices, such as clients, over a network and may be, for example, an Ethernet adapter or Fibre Channel adapter. The storage adapter 75 allows the host processing system 2 to access an associated storage subsystem and may be, for example, a Fibre Channel adapter or a SCSI adapter.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   operating a first virtual server in an active role in a host processing system to serve a client, by using a stateful protocol between the first virtual server and the client;
   associating a second virtual server in a passive role with the first virtual server;
   in response to a predetermined event, causing the second virtual server to take over the active role from the first virtual server, while preserving state for a pending client request sent to the first virtual server in the stateful protocol; and
   sharing state between the first and second virtual servers prior to the predetermined event, by sharing a designated region of memory between the first and second virtual servers, wherein prior to the predetermined event, the first virtual server has read-write permission to access the region of memory and the second virtual server has read-only permission to access the region of memory.

2. A method as recited in claim 1, further comprising:
   causing the second virtual server, acting in the active role, to respond to the pending client request so that a timeout which is specific to said stateful protocol does not occur.

3. A method as recited in claim 1, further comprising:
   maintaining state for client requests, conforming to the stateful protocol, in the designated region of the memory, prior to the predetermined event.

4. A method as recited in claim 3, wherein causing the second virtual server to take over the active role from the first virtual server, while preserving state for a pending client request sent to the first virtual server in the stateful protocol, comprises:
   changing permission of the second virtual server to access the region of memory from read-only to read-write.

5. A method as recited in claim 4, wherein causing the second virtual server to take over the active role from the first virtual server, while preserving state for a pending client request sent to the first virtual server using the stateful protocol, further comprises:
   assigning to the second virtual server a network address associated with the first virtual server.

6. A method as recited in claim 1, wherein causing the second virtual server to take over the active role from the first virtual server comprises:
   updating a host memory page table of the host processing system; and
   updating a guest memory page table of the second virtual server.

7. A method as recited in claim 1, wherein the first and second virtual servers are virtual network storage servers.

8. A method comprising:
   operating a first virtual machine in a host processing system as an active virtual storage server;
   maintaining per-client session state for pending, received client requests, which conform to a stateful network storage protocol, in a designated region of a memory;
   initializing a second virtual machine in the host processing system to be a passive virtual storage server partnered with the first virtual machine;
   sharing said state for pending, received client requests between the first and second virtual machines, by sharing the designated region of the memory between the first and second virtual machines;
   in response to a failure event associated with the first virtual machine, causing the second virtual machine to take over for the first virtual machine as active virtual storage server, without losing state for a pending client request sent to the first virtual machine in the stateful network storage protocol, including modifying a permission of the second virtual machine to access the designated region of the memory; and
   causing the second virtual machine, acting as active virtual storage server, to respond to the pending client request before a response timeout which is specific to the stateful protocol can occur.

9. A method as recited in claim 8, wherein prior to the failure event the first virtual server has read-write permission to access the region of memory and the second virtual server has read-only permission to access the region of memory; and wherein modifying a permission of the second virtual machine to access the shared designated region of memory comprises changing permission of the second virtual machine to access the designated region of memory from read-only to read-write.

10. A method as recited in claim 9, wherein causing the second virtual server to take over the active role from the first virtual server, while preserving state for a pending client request sent to the first virtual server in the stateful protocol, comprises:
   updating a host memory page table of the host processing system; and
   updating a guest memory page table of the second virtual server.

11. A method as recited in claim 10, wherein causing the second virtual machine to take over for the first virtual machine as active virtual storage server further comprises:
   assigning to the second virtual storage server a network address associated with the first virtual storage server.

12. A system comprising:
   a physical host processing system;
   a first virtual machine which operates in the physical host processing system as an active server to serve a client over a network, by using a stateful protocol between the first virtual machine and the client;
   a second virtual machine configured as a passive partner of the first virtual machine, wherein the second virtual machine is pre-initialized and maintained in a state that passively mirrors a state of the active server, the second virtual machine configured to respond to a predetermined event by taking over as the active server for the first virtual machine while preserving state for a pending client request sent to the first virtual machine in the stateful protocol; and
   a memory that includes a designated region shared by the first virtual machine and the second virtual machine, wherein prior to the predetermined event, the first virtual machine has read-write permission to access the region of memory and the second virtual machine has read-only permission to access the region of memory.

13. A system as recited in claim 12, wherein the first and second virtual machines operate as network storage servers.

14. A system as recited in claim 12, wherein the second virtual machine, after taking over as the active server, responds to the pending client request before a response timeout which is specific to the stateful protocol can occur.

15. A system as recited in claim 12, wherein the active server maintains state for client requests in the designated region of the memory.

16. A system as recited in claim 12, further comprising:
   a hypervisor through which the first virtual machine and the second virtual machine access the memory.

17. A system as recited in claim 16, wherein the system is configured to change permission of the second virtual machine to access the region of memory from read-only to read-write as part of a takeover by the second virtual machine for the first virtual machine.

18. A system as recited in claim 17, wherein the system is further configured to update a host memory page table of the physical host processing system and a guest memory page table of the second virtual machine as part of the takeover by the second virtual machine for the first virtual machine.

19. A system as recited in claim 18, wherein the system is further configured to assign to the second virtual machine a network address associated with the first virtual machine as part of the takeover by the second virtual machine for the first virtual machine.

20. A storage server comprising:
   a network interface through which to receive client requests over a network, the client requests conforming to a stateful network storage protocol;
   a non-volatile mass storage facility to store data in response to one or more of the client requests;
   a processor, coupled to the network interface and the non-volatile mass storage facility;
   a memory; and
   a storage device coupled to the processor and storing code which, when executed, causes operations to be performed in the storage server, the operations including
      operating a first virtual server in the storage server in an active role to serve a client, by using the stateful network storage protocol between the first virtual server and the client;
      associating a second virtual server in a passive role with the first virtual server; and
      in response to a predetermined event, causing the second virtual server to take over the active role from the first virtual server, without losing state for a pending client request sent to the first virtual server in the stateful network storage protocol, wherein the operations further comprise sharing state between the first and second virtual servers prior to the predetermined event, by sharing a designated region of the memory between the first and second virtual servers, wherein prior to the predetermined event, the first virtual server has read-write permission to access the region of memory and the second virtual server has read-only permission to access the region of memory.

21. A storage server as recited in claim 20, wherein the operations further comprise:
   causing the second virtual server, having assumed the active role, to respond to the pending client request so that a timeout which is specific to the stateful protocol does not occur.

22. A storage server as recited in claim 20, wherein the operations further comprise:
   maintaining state for client requests, conforming to the stateful protocol, in the designated region of the memory, prior to the predetermined event.

23. A storage server as recited in claim 22, wherein causing the second virtual server to take over the active role from the first virtual server, without losing state for a pending client request sent to the first virtual server in the stateful protocol, comprises:
   changing permission of the second virtual server to access the region of memory from read-only to read-write.

24. A storage server as recited in claim 23, wherein causing the second virtual server to take over the active role from the first virtual server, without losing state for a pending client request sent to the first virtual server in the stateful protocol, further comprises:
   assigning to the second virtual server a network address associated with the first virtual server.

25. A storage server as recited in claim 20, wherein causing the second virtual server to take over the active role from the first virtual server comprises:
   updating a host memory page table of the host processing system; and
   updating a guest memory page table of the second virtual server.

* * * * *